United States Patent Office.

JOHN P. RUST, OF PEABODY, MASSACHUSETTS.

Letters Patent No. 108,191, dated October 11, 1870.

IMPROVEMENT IN REMOVING GREASE FROM WASTE LEATHER.

The Schedule referred to in these Letters Patent and making part of the same.

*To all persons to whom these presents may come:*

Be it known that I, JOHN P. RUST, of Peabody, of the county of Essex and State of Massachusetts, have invented a new useful Process of Removing Grease from Waste Leather; and do hereby declare the same to be fully described as follows:

The principle of my invention consists—

First, in subjecting the scraps of waste pieces of leather to the action of dry steam; and Second, in applying to them a powerful pressure.

The method ordinarily adopted for extracting the grease has been to boil the leather in water and skim off the grease as it may rise on the surface of the liquid; but by this mode of operation much of the gelatine or other extraneous matter rises and is skimmed off with the grease, and is more or less detrimental to it; but by my process nearly if not quite all this foreign matter is retained in the leather, the oil or grease being obtained in a state very nearly pure, or unmixed with other matters, no purifying process being necessary to it to render it fit for use for curriers or for the manufacture of soap.

In carrying out my invention, the waste leather is to be put into a tank or vessel provided with a foraminous platform, arranged within it a few inches above its bottom. Into the space between the said bottom and platform a pipe leading from the steam-space of a steam-generator is to be extended, the part of such pipe which may be within the tank being coiled around therein, and perforated with numerous holes, in order to distribute the steam equally, or about so, against the lower surface of the platform.

The vessel is to be provided with a suitable pipe or conduit for drawing off the water that may be formed by the condensation of the steam.

Having closely covered the vessel, the contents are to be subjected for about one hour to the action of dry steam, or steam at about sixty pounds pressure to the square inch, after which the mass of leather is to be put into a press and condensed so as to expel from it the oil or grease, which will readily run from it.

The leather, after the removal of the grease from it, may be used for fuel, or may be otherwise utilized.

I claim—

The process described, of treating old or waste leather, for the purpose of extracting from it the grease contained in it, such process consisting in subjecting the leather to the action of dry steam and pressure, substantially as explained.

J. P. RUST.

Witnesses:
   R. H. EDDY,
   J. R. SNOW.